US012257202B2

(12) United States Patent
Markowski

(10) Patent No.: US 12,257,202 B2
(45) Date of Patent: Mar. 25, 2025

(54) EXERCISE ROLLER WITH HANDLES

(71) Applicant: John Markowski, Sparkill, NY (US)

(72) Inventor: John Markowski, Sparkill, NY (US)

( * ) Notice: Subject to any disclaimer, the term of this patent is extended or adjusted under 35 U.S.C. 154(b) by 0 days.

(21) Appl. No.: 17/712,241

(22) Filed: Apr. 4, 2022

(65) Prior Publication Data

US 2023/0310259 A1 Oct. 5, 2023

(51) Int. Cl.
*A61H 15/00* (2006.01)
*A63B 21/00* (2006.01)

(52) U.S. Cl.
CPC ..... *A61H 15/0092* (2013.01); *A63B 21/4035* (2015.10); *A61H 2015/0014* (2013.01); *A61H 2201/0157* (2013.01); *A61H 2201/1623* (2013.01); *A61H 2201/1671* (2013.01)

(58) Field of Classification Search
CPC ........ A61H 15/0092; A61H 2015/0014; A61H 2015/0057; A61H 2203/0456; A61H 2205/081; A61H 2201/0107; A61H 2201/0153; A61H 2201/0157; A61H 2201/1623; A61H 2201/1253; A61H 2201/1261; A61H 2201/1269; A61H 2201/1671; A61H 2201/1692; A61H 15/00; A61H 15/0078–0085; A61H 2015/0007–0064; A63B 21/4035; A63B 2023/006; A63B 23/0211; A63B 22/20–203; A63B 21/4043; A63B 21/4049
USPC .......... 601/119, 99, 112, 115, 118, 120, 123, 601/125; D24/211–215
See application file for complete search history.

(56) References Cited

U.S. PATENT DOCUMENTS

| | | | | | |
|---|---|---|---|---|---|
| 1,265,083 | A * | 5/1918 | Hoard | A61H 15/00 | 601/118 |
| 3,117,781 | A * | 1/1964 | Vargo | A63B 21/0023 | 482/91 |
| 3,298,687 | A | 1/1967 | Douglas | | |
| 3,831,238 | A * | 8/1974 | Adams | B05C 17/0217 | 492/14 |
| 4,603,854 | A * | 8/1986 | Krausz | A63B 23/0211 | 482/111 |
| 4,993,408 | A * | 2/1991 | Schweisfurth | A61H 15/0092 | 601/123 |
| 5,364,338 | A * | 11/1994 | Terashima | A61H 15/0092 | 601/118 |
| 5,575,760 | A * | 11/1996 | Masuda | A61H 15/0092 | 601/19 |

(Continued)

*Primary Examiner* — Timothy A Stanis
(74) *Attorney, Agent, or Firm* — Kattina V. Barsik, Esq.

(57) ABSTRACT

A foam roller includes a cylindrical main body having a hollow interior extending in a first direction. The foam roller further includes a first portal and a second portal extending into said cylindrical main body in a second direction transverse to said first direction and inline with each other. The foam roller further includes a first arm and a second arm. The first arm is sized to fit within said first portal and the second arm sized to fit within the second portal. The foam roller can be rolled by way of the arms while a torso is held against the roller. The arms are fixedly or removably connected to the roller portion thereof and prevent the roller from rolling fully around which being rollable by way of pulling the arms. The foam roller may also include end caps on the roller to attach the arms thereto.

12 Claims, 5 Drawing Sheets

(56) References Cited

U.S. PATENT DOCUMENTS 5,643,182 A * 7/1997 Engel ................. A61H 15/0092 601/123
6,241,693 B1 * 6/2001 Lambden ........... A61H 15/0092 601/129
6,398,694 B1 * 6/2002 Bountourakis .. A63B 21/00069 601/134
7,311,644 B2 12/2007 Hale
9,808,665 B1 * 11/2017 Demarais ........... A63B 21/4035
9,895,285 B2 * 2/2018 Ingrassia ................ A61H 39/04
RE46,803 E 4/2018 Bronston et al.
9,937,378 B2 4/2018 Dalebout et al.
10,039,690 B2 8/2018 Kramer
10,561,923 B1 * 2/2020 Harvey .............. A63B 71/0036
2005/0131320 A1 * 6/2005 Lee .................... A61H 15/0092 601/119
2005/0176565 A1 * 8/2005 Dua ....................... A21C 3/021 492/14
2006/0142677 A1 * 6/2006 Perez ................. A61H 15/0092 601/123
2007/0287938 A1 * 12/2007 Shields .............. A61H 15/0092 601/118
2008/0167168 A1 * 7/2008 Hurst ..................... A63B 22/20 482/132
2010/0107428 A1 * 5/2010 Lee ........................ B27G 17/02 30/489
2011/0313333 A1 * 12/2011 Nicholson .......... A61H 15/0092 601/120
2012/0150082 A1 * 6/2012 Davis ................. A61H 15/0092 601/118
2012/0259257 A1 * 10/2012 Nelson ................... A61H 39/04 601/119
2013/0090582 A1 * 4/2013 Bertram ............. A61H 15/0092 601/119
2013/0138024 A1 * 5/2013 Jennings ............ A61H 15/0092 601/119
2014/0171835 A1 * 6/2014 Solomon ................ A61H 1/003 601/5
2014/0358050 A1 * 12/2014 Stock ................. A61H 15/0092 601/119
2015/0073321 A1 * 3/2015 Taylor ................ A61H 15/0092 601/118
2015/0150751 A1 * 6/2015 Fitzmaurice ....... A61H 15/0092 601/119
2015/0209220 A1 * 7/2015 Lin .................... A61H 15/0092 601/119
2016/0030801 A1 * 2/2016 Porto ................. A61H 15/0092 482/139
2017/0080283 A1 3/2017 Harman
2017/0143583 A1 * 5/2017 Lin .................... A61H 15/0092
2018/0049940 A1 * 2/2018 Cannon .............. A61H 15/0092
2018/0168918 A1 * 6/2018 Liburd ............... A61H 15/0092
2018/0263843 A1 * 9/2018 Chen ...................... A61H 15/02
2019/0053973 A1 * 2/2019 de Balasi Brown ......................... A61H 15/0092
2019/0105528 A1 * 4/2019 Bardakci ................ A63B 23/14
2021/0022954 A1 * 1/2021 Jones ................... A63B 21/075
2021/0128399 A1 * 5/2021 Wersland ............... A61H 23/02
2022/0104994 A1 * 4/2022 Branz ................ A61H 15/0092
2022/0280371 A1 * 9/2022 Dekle .................. A61H 23/006

* cited by examiner

EXERCISE ROLLER WITH HANDLES

FIELD OF THE DISCLOSED TECHNOLOGY

The disclosed technology relates generally to a exercise rollers, and more specifically to a roller with rigid transverse handles.

BACKGROUND

Therapeutic foam rollers are used as a part of exercise. One rolls their body over the roller, moving their torso, usually along the back, of the roller. One must tighten their core and back muscles in order to transfer kinetic energy from their legs to the roller. Thus, a drawback to such rollers is that one cannot relax their muscles, especially back muscles, while moving over the roller. This forces the spine to be put under compression forces and disfavors pressure in the legs/feet against the ground.

SUMMARY OF THE DISCLOSED TECHNOLOGY

In the disclosed technology herein, the roller can be pulled by way of arm handles allowing the user's torso to pass over the roller even in a relaxed muscle state of the torso. Distraction is created along the vertebrae of the spine. This spinal decompression therapy relieves pressure on the spinal discs by separating the vertebrae rather than compressing them.

A foam roller of embodiments of the disclosed technology has an uncompressible (rigid) interior section. A compressible (resilient) foam section surrounds some, at least a majority of, or substantially all of the rigid section. The "foam" can be any material which is compressible and resilient including rubber, plastic, and other materials. A portal on either side of the foam section (extending therethrough or closer to an extreme end than) extends into the interior section. These portals, in embodiments of the disclosed technology, are equidistant from respective extreme ends of the foam roller and/or rigid interior section. An end cap is on each end of the interior section and is removably or fixedly placed there-on the interior section and/or forms a unitary structure therewith. A portal of each end cap extends inline with a respective portal on either side of the foam section. The portals can be threaded within the interior section and/or within the end caps. As such, respective portals can be adapted to removably attach the foam roller to the arms, the arms being perpendicular to the foam roller and/or rigid interior section. The arms or handles have a longest linear length being transverse to a longest linear length of the interior section when attached thereto.

Described another way, a foam roller has a cylindrical main body with a first portal and a second portal extending into the cylindrical main body and inline with each other (at a same circumferential location on the exterior of the main body, albeit at a different position along the longest length of the cylinder, the length being perpendicular to a circular circumference of the cylinder). A first arm is sized to fit within the first portal and a second arm, within the second portal.

The first arm and the second arm can be substantially equally, or equally, sized to each other and equidistant from respective first and second ends of the foam roller and/or cylindrical main body. The first arm and the second arm prevent the cylindrical main body from completely revolving on a planar surface where such planar surface is one which is fully below the foam roller (such as where a shortest length of the planar surface is at least a length of the cylindrical body). Thus, with the arms attached transverse to the main body, the main body/foam roller can roll only less than 180 degrees on the planar surface.

The cylindrical main body, in embodiments of the disclosed technology, has a hollow interior where the first and second portals extend therein. Caps can be used to close/cover each end of the hollow interior. Such caps can have an open circular region into an interior cylindrical portion sized to fit within, or exterior to, the cylindrical main body and seal/cover ends of the interior of the main body. A threaded portal, such as a single or two portals which is/are transverse to an end of respective caps and/or main body can extend there-into the respective main body/cap. That is, a cap may only have two openings: a first circular opening inline with the cylindrical opening and a second opening transverse thereto. The main body may only have four openings: two circular openings at either end into a cylinder and two which are transverse thereto. The respective transverse portals of the caps and main body can be inline with each other when the cap is fully secured onto the main body such that the first arm and/or second arm can be inserted through the cap and main body and be secured to the cap and main body, such as by way of threading on the first arm and/or second arm as well as one or both of the main body and cap.

The cylindrical body, in embodiments of the disclosed technology, is surrounded by compressible foam which, in some embodiments, surrounds the caps and in other embodiments the caps are devoid of such surrounding foam.

One can use the foam roller by attaching the arms to respective portals of the caps and/or cylindrical main body and then rotating the foam roller using one's back against the foam and/or own arms grasping the arms of the foam roller.

Any device or step to a method described in this disclosure can comprise or consist of that which it is a part of, or the parts which make up the device or step. The term "and/or" is inclusive of the items which it joins linguistically and each item by itself.

DETAILED DESCRIPTION OF EMBODIMENTS OF THE DISCLOSED TECHNOLOGY

A foam roller with handles in embodiments of the disclosed technology has rigid handles which extend elongated into a pole structure. There are two such handles/poles which attach to either side of a foam roller, which is another elongated pole structure which at it's longest length is perpendicular to the longest lengths of the handles in embodiments of the disclosed technology. End caps of the foam roller, a rigid cylindrical member with foam covering at least a majority thereof, attach to the longitudinal ends (most extreme ends) and are cylindrical themselves. These end caps can have a portal extending in parallel to the arms and/or transverse/perpendicular to the most elongated length of the roller, also called the cylindrical main body. "Longitudinal" of the cylindrical main body and/or arms is defined along the length of the circular cross-sections from end to end which make up the cylinder. The arms (of the roller) have connection mechanisms (such as male or female ends of a screw) which attach to and/or through the end caps and/or poral of the cylindrical main body. "Arms", unless otherwise specified, refers to the arms of the foam roller which are attached to the main cylindrical body (rather than "arms" of a person using the device).

Embodiments of the disclosed technology will become clearer in view of the following description of the figures.

Figure 1:
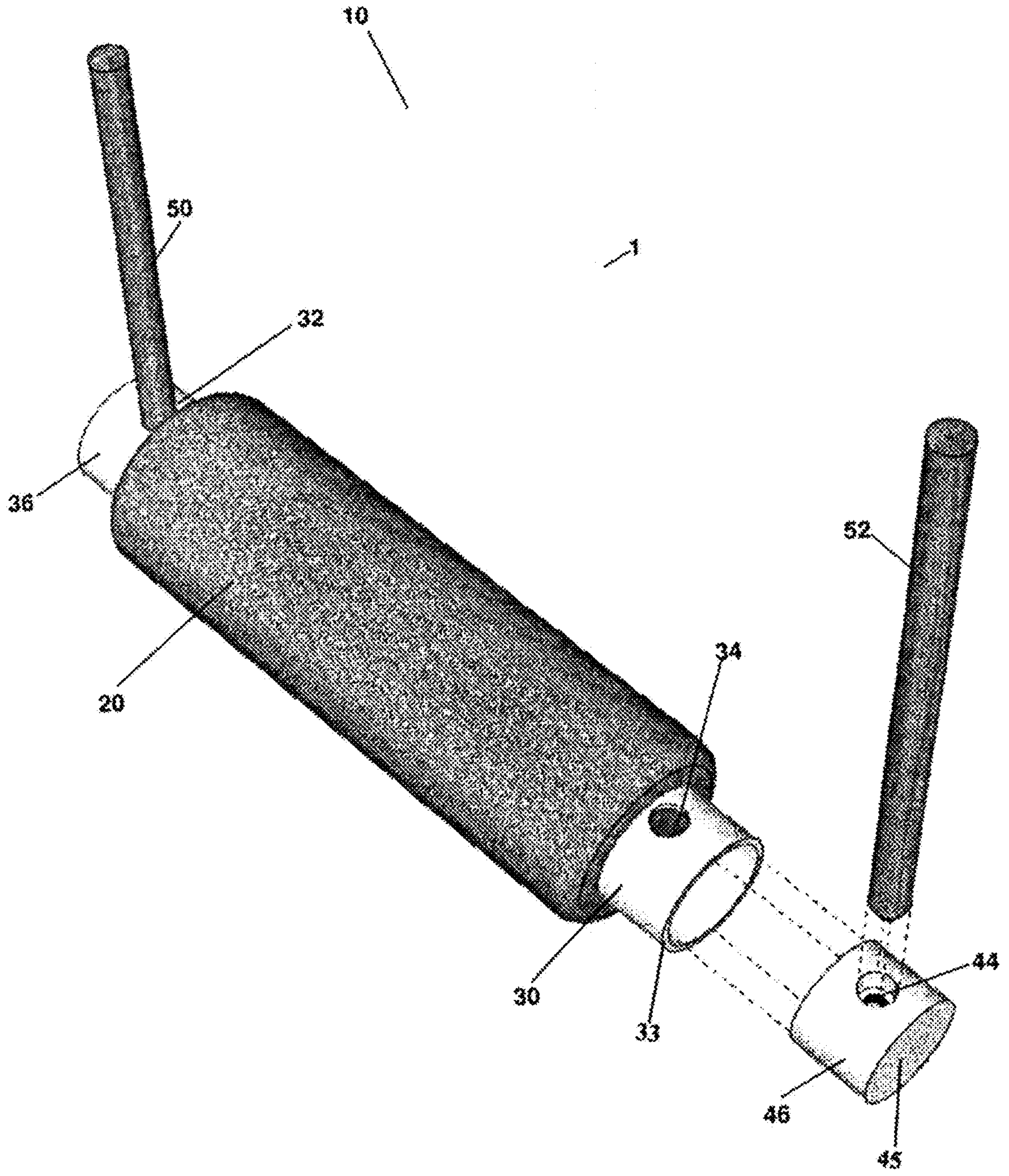
FIG. 1 shows a top perspective view of a foam roller with handles in an embodiment of the disclosed technology.

FIG. 1 shows atop perspective view of a foam roller with handles in an embodiment of the disclosed technology. The fine line 8 is shown in the figures indicating a consistent direction along an XYZ plane. The foam roller 10 has a cylindrical main body shown covered in foam 20. The foam cushions an otherwise hard surface, such as one of metal, wood, or plastic. The foam can cover a majority, 80% or more, or 100% of the length of the cylindrical section of the foam roller/cylindrical main body. Ends of the cylindrical main body 30 and 36 can protrude or lack a covering of the foam (as shown) or be covered therewith. These ends can extend from an extreme end (first or last circular cross-section) of the cylindrical main body, about 5%, 10%, or 20% of the cylindrical main body in embodiments of the disclosed technology.

Within each end 32 and 30 of the cylindrical main body is a portal 32 and 34, respectively, where respective arms 50 and 52 attach there-into. The arms 50 and 52 are used for grasping with one's hands and "roll" with the foam 20 portion of the roller and cylindrical main body. End caps 36 and 46, wherein each end caps include end portions 45, are used in embodiments of the disclosed technology which cover the ends of the cylindrical main body 32 and 30, respectively, and aligned to edge portions 33 of each ends 32 and 30. The "extreme ends" of the cylindrical main body, in embodiments of the disclosed technology, is defined as portions thereof which are covered by caps, such as caps 36 and 46. Portals within the respective caps 36 and 46 extend into portals 34 and 44 of the ends of the cylindrical main body of the roller. Thus, poles 50 and 52 can be attached through respective end caps and into the ends of the cylindrical main body of the roller. The arms 50 and 52 can be fictionally held, removably attached, and/or fixedly attached within/to the portals of the end caps and/or cylindrical main body such as by way of threaded screws with male and female parts in any of the afore-described connected elements.

Figure 2:
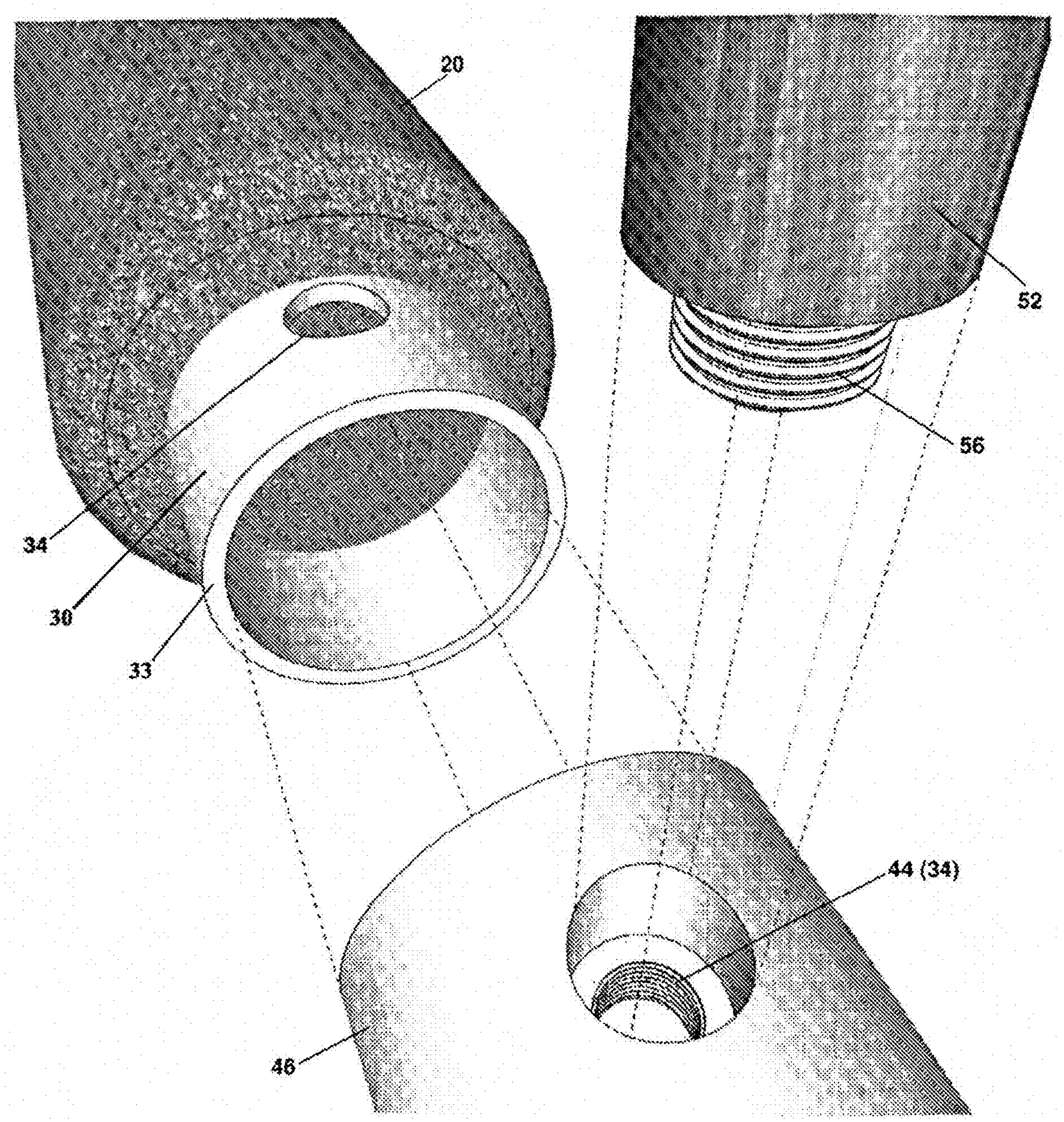
FIG. 2 shows a side perspective view of the foam roller with a handle and cap in a disconnected condition of an embodiment of the disclosed technology.

FIG. 2 shows a side perspective view of the foam roller with a handle and cap in a disconnected condition of an embodiment of the disclosed technology. Here, an extreme end 30 of the main body is shown with a portal 34 extending transverse thereto and into the extreme end. The end cap 46 with a portal 44 (or, if the other end cap, would have a portal 34) fits other the outside or within the inside of part of a length of the circular cross-sections of the cylindrical body of the roller. In this manner, an arm, such as arm 52, with a connection region 56 (as shown, threading) is designed to removably be attached to the end region 30 and cap 46 by way of passing through the portal 34 and into the portal 44 where it is threadibly held.

Figure 3:
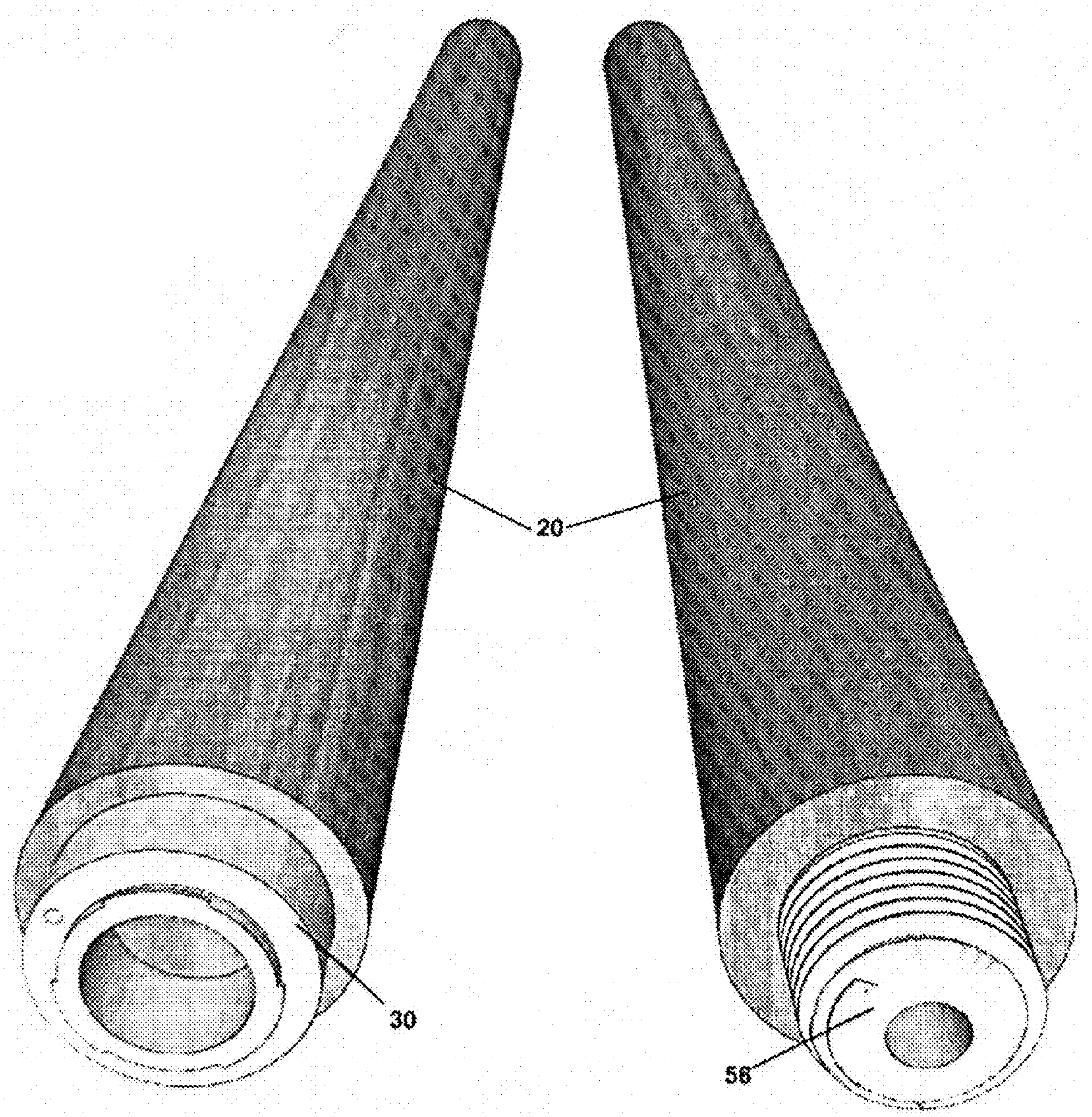
FIG. 3 shows a side perspective view of foam rollers of embodiments of the disclosed technology.

FIG. 3 shows a side perspective view of foam rollers of embodiments of the disclosed technology. The end regions can have female ends 30 or male ends 46 attached to cylindrical roller with foam 20. The foam 20 can be solid such that the cylindrical main body is solid rather than hollow, as shown. The foam can be a layer on a metal/wood or other roller or can be the roller itself, being foam throughout the cylindrical main body.

Figure 4:
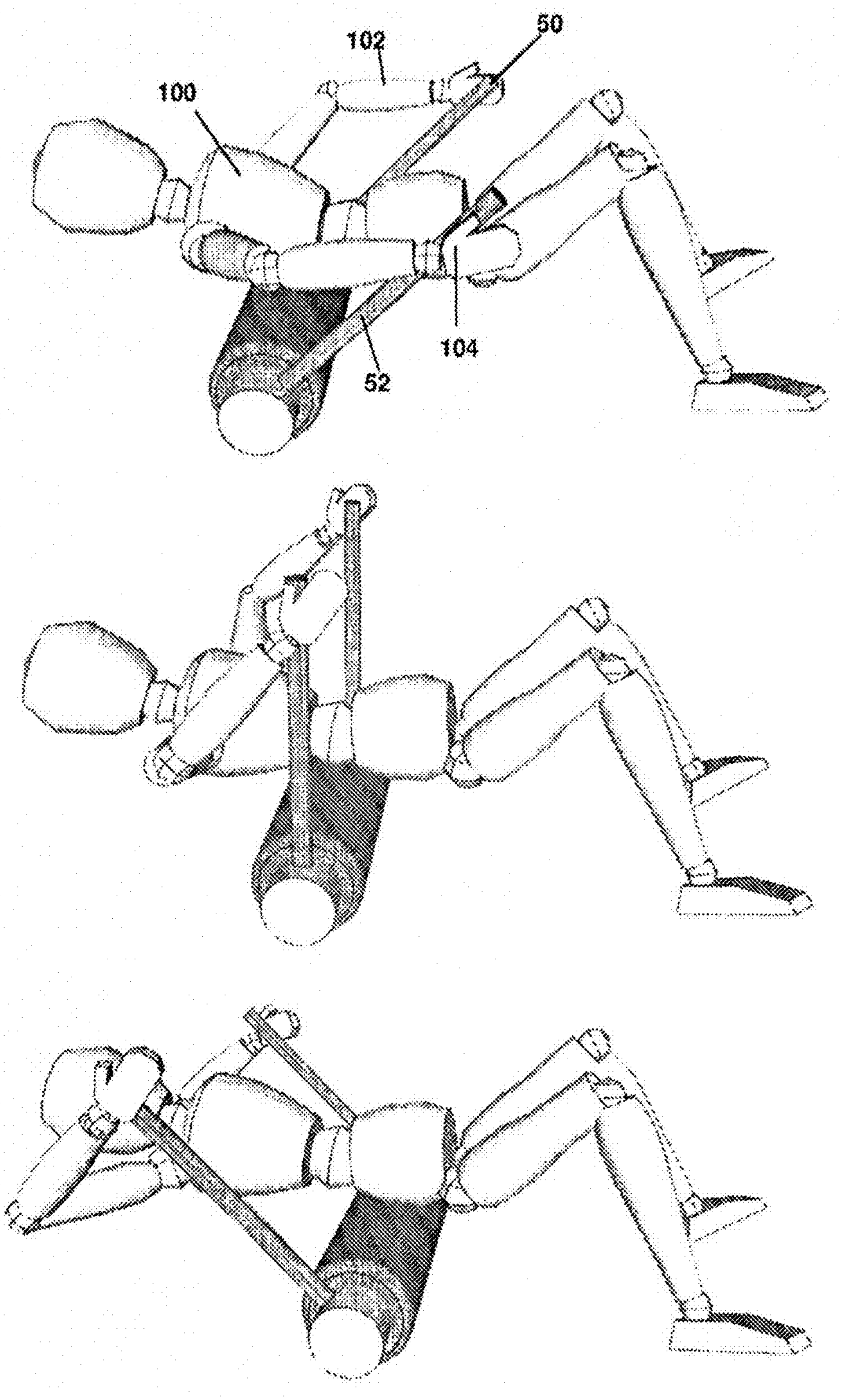
FIG. 4 shows a side perspective view of a foam roller with handles being used in embodiments of the disclosed technology.
Figure 5:
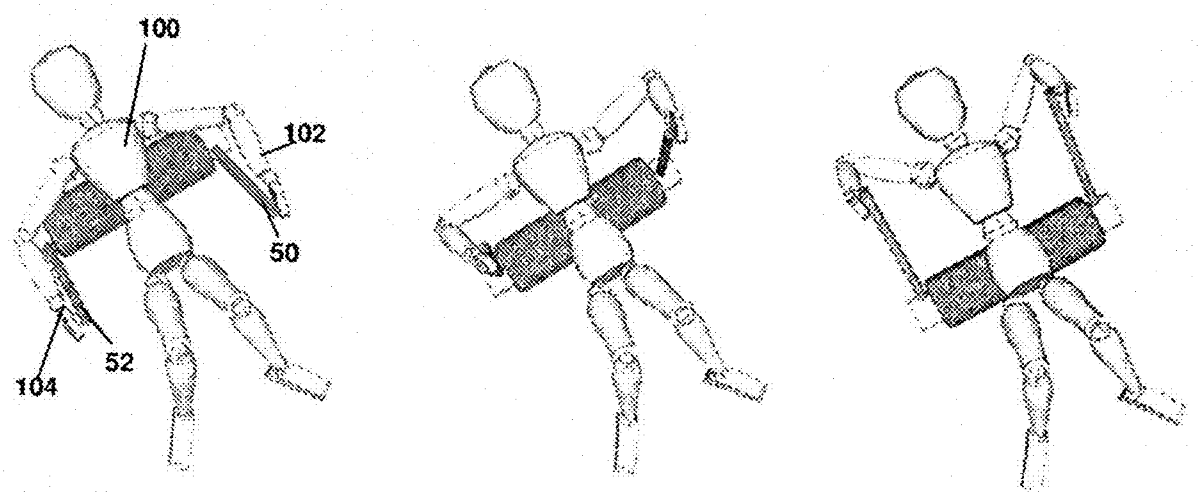
FIG. 5 shows a top perspective view of a foam roller with handles being used in embodiments of the disclosed technology.

FIG. 4 shows a side perspective view of a foam roller with handles being used in embodiments of the disclosed technology. FIG. 5 shows a top perspective view of a foam roller with handles being used in embodiments of the disclosed technology. A person with a torso 100 having a front side (ventral) and back side (dorsal). In the embodiment shown, the back side of the person (back) is against the foam roller 10 and the person uses his arms (the arms of the person) and/or hands 102/104 to rotate the foam roller 10 by way of the arms (of the roller) 50 and 52. The movement of the arms of the roller 50 and 52 cause the roller to rotate rather than the force being applied mainly and/or solely by the back of the person. The main/primary force of rolling can be generated by the hands/arms o the person 102 and 104. As shown in the second and third images, the back (dorsal) side of the person is then "dragged" along the roller. The roller is otherwise free from obstruction along the ground but for the handles which prevent full or half rotation thereof.

For purposes of this disclosure, the term "substantially" is defined as "at least 95% of" the term which it modifies.

Any device or aspect of the technology can "comprise" or "consist of" the item it modifies, whether explicitly written as such or otherwise.

When the term "or" is used, it creates a group which has within either term being connected by the conjunction as well as both terms being connected by the conjunction.

While the disclosed technology has been disclosed with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the invention.

What is claimed is:

1. A foam roller comprising:

a cylindrical main body having a hollow interior extending in a first direction, the cylindrical main body having a first end and a second end, wherein the cylindrical main body is a singular body and the hollow interior extends in a longitudinal direction from the first end to the second end;

a first portal and a second portal extending into said cylindrical main body in a second direction transverse to said first direction and inline with each other;

a first cap and a second cap, wherein each said first cap and said second cap comprises, a cylindrical portion sized to fit within the hollow interior of said cylindrical main body to be entirely accommodated within the hollow interior, and a threaded portal transverse to said cylindrical portion, said threaded portal inline and interior to said respective first portal and second portal;

a first arm threadably held within said first portal and said threaded portal inline and interior to the first portal; and a second arm threadably held within said second portal and said threaded portal inline and interior to the second portal, wherein the foam roller is configured to pull a user torso by way of the first arm and the second arm allowing the user torso to pass over the foam roller thereby creating distraction along vertebrae of spine thus decompressing the spine;

wherein;

said hollow interior extending from the cylindrical main body, said hollow interior further comprises an edge portion defining an end of said hollow interior, said cylindrical portion of said first or second cap comprises an end portion, wherein the cylindrical portion is sized to fit within the hollow interior of said cylindrical main body to be entirely accommodated within the hollow interior such that the edge portion and the end portion are aligned in a same plane.

2. The foam roller of claim 1, wherein said first arm and said second arm are substantially equally sized to each other.

3. The foam roller of claim 2, wherein said first arm and said second arm prevent said cylindrical main body from completely revolving on a planar surface, said planar surface having a shortest length at least a length of said cylindrical main body.

4. The foam roller of claim 3, wherein said first arm and said second arm prevent said cylindrical main body from rolling in a complete circle and allow said cylindrical main body to rotate at least 180 degrees on said planar surface.

5. The foam roller of claim 1, wherein said first portal and said second portal extend into said hollow interior at a region of said cylindrical main body with an incompressible exterior lacking foam.

6. The foam roller of claim 1, wherein each said first arm and said second arm comprises a threaded end sized to be threadably and removably connected to at least one of said first cap and said second cap, a longest linear length of said first arm and said second arm being entirely transverse to a longest length of said cylindrical main body.

7. The foam roller of claim 6, wherein said cylindrical main body is surrounded by compressible foam and said first cap and said second cap lack compressible foam.

8. The foam roller of claim 7, wherein the end caps are surrounded by portions of said cylindrical body lacking said compressible foam.

9. A method of using a foam roller comprising the steps of:

providing a user with the foam roller of claim 1:

attaching said first arm to said first portal and said threaded portal inline and interior to the first portal;

attaching said second arm to said second portal and said threaded portal inline and interior to the second portal;

rotating, using said first arm and said second arm, said cylindrical main body on a planar surface creating traction along vertebrae of a spine of a person carrying out said method thereby relieving pressure on a spinal disc by separating said vertebrae.

10. The foam roller of claim 1, wherein:

the first portal and said threaded portal, are non-through portals, whereby the first arm is threadably held within said first portal and said threaded portal without extending beyond the hollow interior; and the second portal and said threaded portal, are non-through portals whereby the second arm is threadably held within said second portal and said threaded portal without extending beyond the hollow interior.

11. A foam roller comprising:

an incompressible interior section having a hollow interior, wherein the incompressible interior section is a singular body and the hollow interior extends in a longitudinal direction;

a compressible foam section surrounding at least a majority of said interior section;

a portal on each side of said compressible foam section extending into said interior section;

end caps on opposite ends of said interior section unshrouded by the compressible foam;

a portal of each said end cap extending inline with a respective portal on either side of said compressible foam section and transverse to a longest extent of said interior section;

two handles being substantially entirely transverse to a longest linear length of said interior section, wherein each end caps having, a cylindrical portion sized to fit within the interior section to be entirely accommodated within the interior section, and a threaded portal transverse to said cylindrical portion, said threaded portal inline and interior to said portal; and wherein, the two handles being threadably held within said portal and said threaded portal inline and interior to the portal, wherein the foam roller is configured to pull a user torso by way of the two handles allowing the user torso to pass over the foam roller thereby creating distraction along vertebrae of spine thus decompressing the spine;

wherein;

said hollow interior extending from the cylindrical main body, said hollow interior further comprises an edge portion defining an end of said hollow interior, said cylindrical portion of said first or second cap comprises an end portion, wherein the cylindrical portion is sized to fit within the hollow interior of said cylindrical main body to be entirely accommodated within the hollow interior such that the edge portion and the end portion are aligned in a same plane.

12. The foam roller of claim 11, wherein said two handles are removably connected to said interior section at opposite ends of said interior section through respective said portals on either side of said foam section.

* * * * *